UNITED STATES PATENT OFFICE.

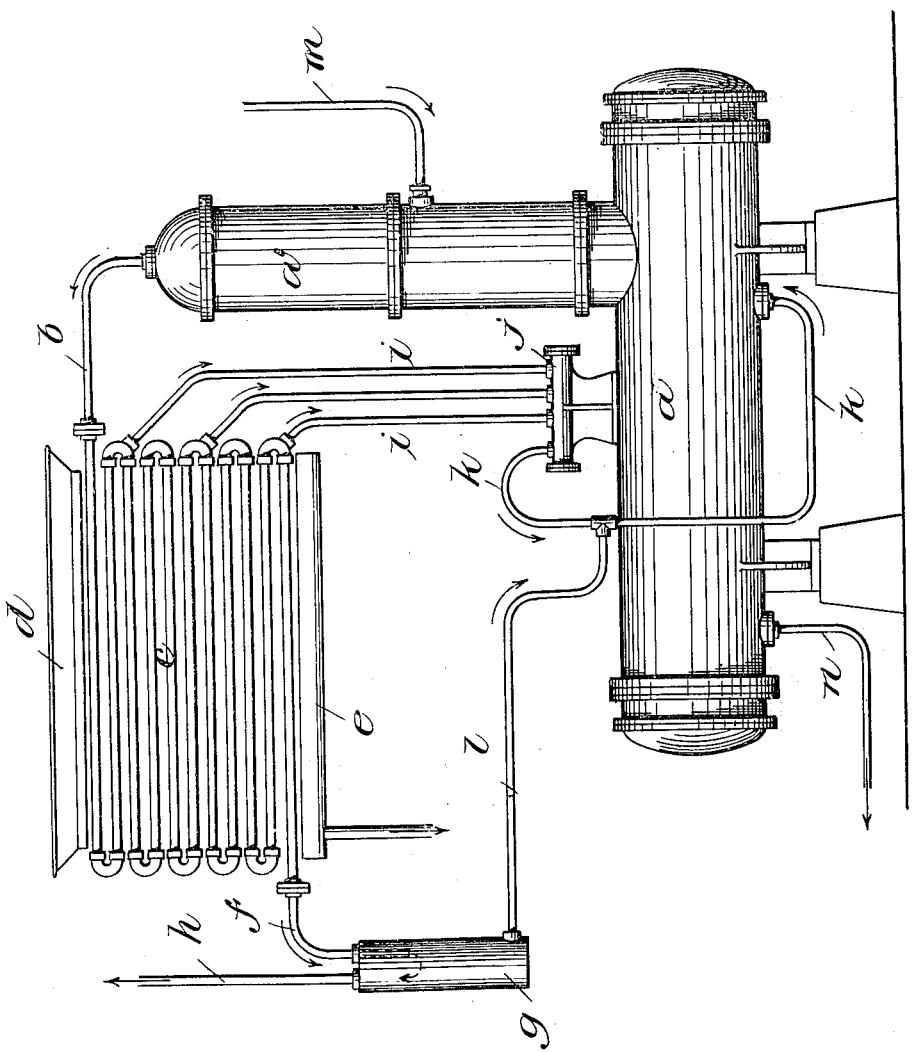

BURCHARD THOENS, OF NEW YORK, N. Y.

AMMONIA-STILL.

No. 818,858.　　　Specification of Letters Patent.　　　Patented April 24, 1906.

Application filed April 8, 1905. Serial No. 254,548.

*To all whom it may concern:*

Be it known that I, BURCHARD THOENS, a subject of the Emperor of Germany, residing at New York, in the county of New York and State of New York, have invented certain new and useful Improvements in Ammonia-Stills; and I do hereby declare the following to be a full, clear, and exact description of the invention, such as will enable others skilled in the art to which it appertains to make and use the same.

My invention relates to improvements in absorption ice and refrigeration machines, having for its object the production of an apparatus by means of which practically anhydrous ammonia-gas can be produced, which results in a high degree of efficiency in the action of absorption-machines, as it has been estimated by authorities in this art that the presence of each five per cent. of water in ammonia reduces the efficiency of the apparatus about twenty per cent.

With this object in view my invention consists in the construction and combinations of parts as hereinafter described and claimed.

In the accompanying drawing the figure represents a side elevation of my improved apparatus.

$a$ represents the generator in which the ammonia liquor is heated, which is provided near one end with an upwardly-extending drum $a'$. This drum communicates, by means of a pipe $b$, with a rectifier-coil $c$, which is cooled by means of water sprayed over it from a sprinkler $d$ of any suitable construction, the cooling-water being collected in a trough $e$ and carried off by a pipe. The discharge end of the rectifier-coil is connected with a pipe $f$, which runs some distance down into the separator $g$, and the practically pure ammonia-gas escapes from the top of this separator through the pipe $h$ to a condenser. (Not shown.)

$i$ $i$ $i$ represent drain-pipes connected with the bends of the rectifier-coil $c$ and with a manifold $j$, and any water carried over by the ammonia-gas is condensed in the coil $c$ and passes back through the pipes $i$ into the manifold $j$, from whence it overflows into a pipe $k$, connected thereto, and thence passes into the generator $a$. An additional drain-pipe $l$ is preferably used, connecting the lower part of the separator $g$ with the pipe $k$, and this pipe $l$ carries back the last few remaining drops of water to the generator, more especially as the pipe $f$ projects downwardly into the separator $g$ for some distance. By the means shown the separation of the ammonia-gas from water and watery vapors is practically complete, and the gas which escapes through the pipe $h$ is practically anhydrous.

Instead of the particular form of separator shown at $g$ I may use any standard type of separator.

$m$ and $n$ represent supply and exhaust pipes for the rich and weak liquor, respectively.

Having thus described my invention, what I claim as new, is—

1. In an ammonia-still, the combination of a generator, a rectifier-coil connected thereto, means for cooling said coil, pipe connections running from the bends of said coil to the bottom of said generator, a separator connected to the outlet end of said coil, and a pipe running from said separator to a part of said pipe connections, substantially as described.

2. In an ammonia-still, the combination of a generator, a rectifier-coil connected to said generator, means for delivering a spray of water upon said coil, a manifold mounted on said generator, drain-pipes connected to said manifold and to the bends of said coil, a separator connected to the outlet end of said coil, a pipe connecting said manifold to said generator, and a pipe connecting said last-named pipe to said separator, substantially as described.

In testimony whereof I affix my signature in presence of two witnesses.

BURCHARD THOENS.

Witnesses:
　CHARLES E. SEM,
　MAD WILDFEUER.